Dec. 14, 1937.  L. H. ROLLER  2,102,034
VALVE
Filed April 16, 1934
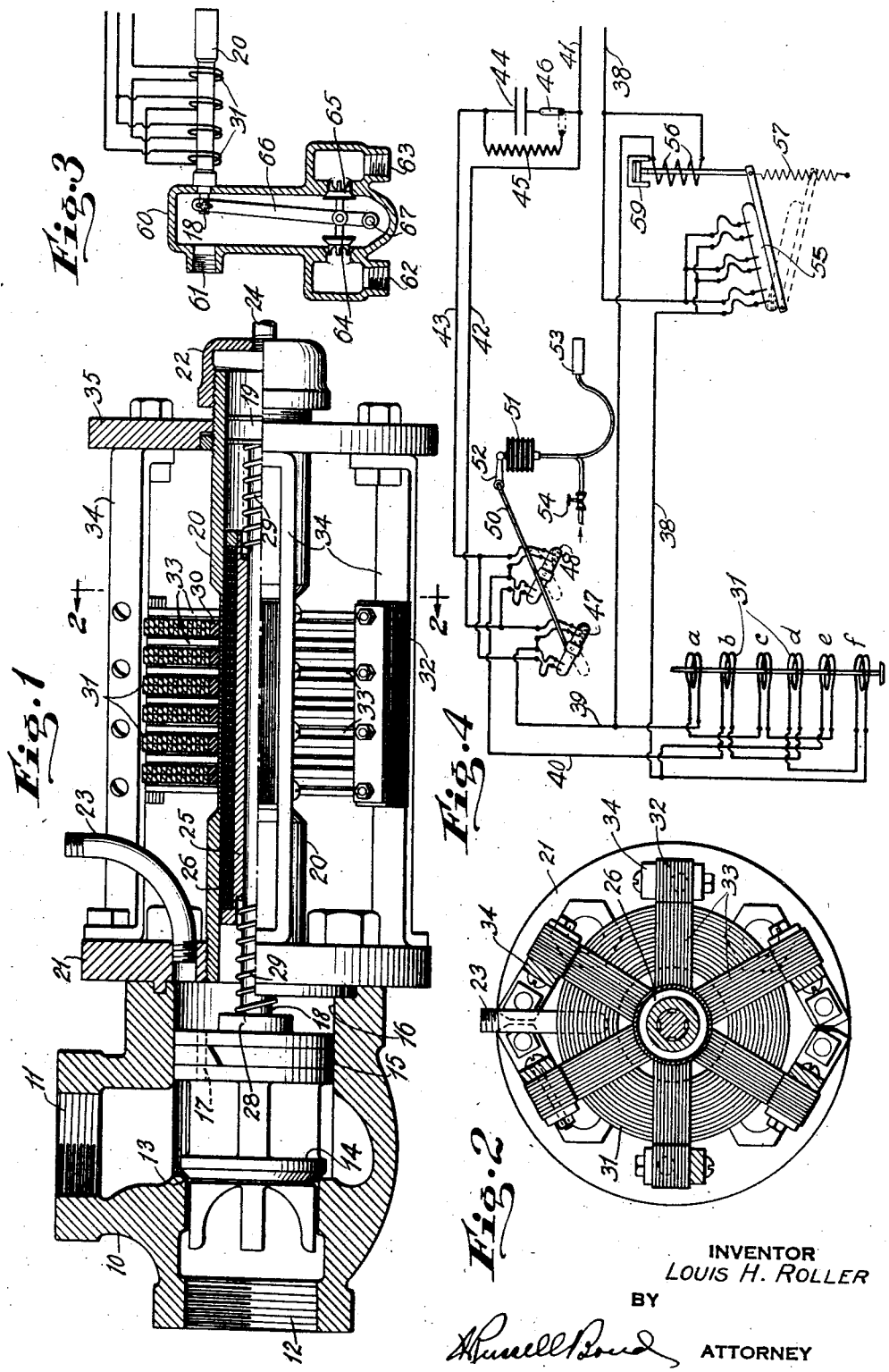
INVENTOR
Louis H. Roller
BY
H. Russell Boud, ATTORNEY Patented Dec. 14, 1937

2,102,034

UNITED STATES PATENT OFFICE 2,102,034

VALVE

Louis H. Roller, Plainfield, N. J.

Application April 16, 1934, Serial No. 720,695

4 Claims. (Cl. 172—240)

The present invention relates to valves of the type actuated by electrical means and has for an object to provide a valve having an electric motor for opening and/or closing the same.

I am aware that it is not new to use a solenoid for operating a valve, either to open or to close the same, but a solenoid is not reversible and hence is used to move the closure member of the valve in one direction while a spring is employed to move said member in the opposite direction. This has the disadvantage that considerable energy must be exerted to overpower the spring and this energy must be expended as long as the spring pressure is opposed.

An object of the present invention is to provide a reversible motor operated valve, the motor being reversible and consuming no energy except during the actual opening and closing of the valve.

More specifically my invention provides a valve combined with a straight-line motion electric motor, the moving parts of the valve and motor being completely encased so that there will be no possibility of leakage.

A further object of the invention is to provide an operating motor adapted automatically to hammer the valve shut and open, so as to insure a tight closure and also to insure opening of a tightly closed valve with a motor of comparatively small power and dimensions.

The present application is a continuation in part of my copending application Serial No. 275,682, filed May 7, 1928, now Patent No. 1,954,831, issued April 17, 1934.

With the above-named objects in view and others which will appear hereinafter, I shall now describe certain embodiments of my invention and thereafter the novelty and scope of the invention will be pointed out in the claims.

In the accompanying drawing:

Figure 1 is a view, partly in elevation and partly in longitudinal section, of one embodiment of my invention;

Fig. 2 is a view in transverse section taken on the line 2—2 of Fig. 1;

Fig. 3 is a view partly in longitudinal section and partly diagrammatic, of a three-way valve embodying my invention; and Fig. 4 is a diagram of electrical connections showing various control means for operating the valve.

The valve shown in Fig. 1 comprises a casing 10 formed with an intake port 11 and an outlet port 12. Between the ports is a valve seat 13 for a closure member 14. The latter is carried by a piston 15 which has a sliding fit in a cylinder chamber 16 formed in the casing. The purpose of the piston is primarily to serve as a guide for the closure member and in order to balance pressures on opposite sides of the piston a passage 17 is formed through the piston. The piston also has a stem 18 bearing a collar 19 at its outer end which has a sliding fit in a steel casing tube 20. The latter is tightly threaded and sealed in a flange plate 21 bolted to the valve casing. This plate forms a leak-tight closure for the cylinder chamber 16. The outer end of the tube is closed by a cap 22, and to prevent the development of unbalanced fluid pressures on opposite sides of the collar 19, a pipe 23 extends from the chamber 16 and is coupled (by means not shown) to a pipe 24 communicating with the interior of the cap 22.

The motor which operates the valve comprises a stator mounted exteriorly upon the casing tube 20 and an armature operating within said tube. The armature consists of a tubular plunger 25 which slides upon the stem 18 within the tube 20. Mounted on the plunger are metal rings 26 of high electrical and low magnetic conductivity, such as copper, interspersed with rings of low electrical and high magnetic conductivity, such as steel. The arrangement of the rings may be similar to that provided on the armature or plunger of the pump described in said copending application. If desired the rings may be dispensed with and the tubular plunger may be of uniform outside diameter just clearing the inner periphery of the casing tube. In either case it is desirable to provide a magnetic resistance between the casing tube and the armature, which may be effected by forming a clearance gap between the two, as shown, or by providing a copper or brass coating on the plunger 25 or such parts thereof as may contact with the tube 20. This will prevent the armature from sticking to the casing tube.

The armature or plunger 25 plays between the collar 19 and a shoulder 28 formed on the piston 15, but light springs 29 normally hold the plunger in the centered position shown in Fig. 1.

The casing tube 20 is preferably turned down to a thin shell intermediate its ends and may be reinforced with rings 30 of bakelite or similar material when the valve is to be used on high pressure fluids. Fitted upon these rings are disk shaped coils 31 and fitted over the coils are laminated core members 32 of comb shape having teeth 33 which pass between the coils and bear against the steel casing tube 20. These core members are preferably of silicon steel and are fastened to bars 34. The latter are bolted at one end to the flange plate 21 and at the opposite end to a flange plate 35 mounted on the casing tube near the outer end thereof.

It will be observed that there are six coils 31 shown in Fig. 1 and they may be connected, like the coils of the pump stator in said copending application, for operation by three-phase current. However, I prefer to connect the coils for two-phase operation so that the motor may operate on split single-phase alternating current.

In the diagram, Fig. 4, the coils 31 are individually identified by the letters a, b, c, d, e and f. It will be observed that the coils are connected in two parallel groups, one comprising coils a, c and e connected in series, between the main line 38 and a branch line 39 while the other coils b, d and f are connected in series, between main 38 and another branch line 40. Alternate coils in each group are oppositely wound.

The other main 41 has two branches 42 and 43 in the latter of which means are provided to effect a time lag. Such means may be either a condenser 44 or a resistance 45, both of which are indicated in the diagram, with a switch 46 for throwing one or the other into the circuit.

A mercury switch 47 is adapted to connect line 39 alternately to lines 42 and 43, while another mercury switch 48 connects line 40 alternately to lines 42 and 43. The two mercury switches are mounted on a common operating shaft 50 and are set so that the lines 40 and 39 must be connected to different ones of the pair of branches 42 and 43. The two mercury bulbs 47 and 48 constitute a reversing switch for the motor, but, obviously any other form of reversing switch may be employed.

To operate the reversing switch a bellows 51 is provided which acts on a crank 52 fixed to the shaft 50. The bellows may be actuated in response to temperature conditions by thermal bulb 53, or it may be actuated manually by means of a valve 54 connecting it to or disconnecting it from a source of fluid pressure (not shown).

In the line 38 there is a triple mercury switch 55 which is normally open, as shown. When this switch is tilted in either direction the ball of mercury therein will make successive contact with the three parallel pairs of contacts projecting into the switch bulb but as will appear hereinafter only when the bulb is returning to the full time position illustrated will it cause successive impulses to pass through the coils 31 of the motor stator. A solenoid 56 tends to tilt the switch 55 to the position shown in full lines while an opposing spring 57 tilts the switch to the dotted line position when the solenoid is deenergized. The solenoid is connected across lines 38 and 39 and is normally energized except for the brief intervals when mercury bulb 47 is oscillating from one position to the other. However, since the solenoid has little work to do it draws little energy from the mains. A dash pot 59 serves to dampen the movement of the triple switch 55 toward the full line position. Obviously, instead of the triple switch and its operating mechanism any standard time switch may be employed which will cause a set of impulses to pass through the stator coils after each operation of the reversing switch.

The operation of the valve will now be clear. Assume that the valve is open and the armature 25 is in the normal centered position, with reversing switch in the position shown in the diagram. When the reversing switch is thrown either by manual operation or by thermal conditions the solenoid is momentarily deenergized and the triple switch is immediately pulled to the dotted line position by spring 57. However, as soon as the throw of the reversing switch is completed, reversing the phase connections of the stator coils, the solenoid will be reenergized and by reason of the dash pot will comparatively slowly restore the triple switch to its normal full line position. During such restoration three separate impulses will be sent through the stator coils causing the armature 25 to deliver three blows to the shoulder 28, thereby not only closing the valve but hammering it shut. Upon the next actuation of the reversing switch the action of the triple switch will be repeated, but now, because of the reverse connection of the coils, the armature will move under power in the reverse direction and will deliver three blows upon the head 19 to insure opening of the valve.

While I have shown a stator with six coils 31, so as to provide three pairs of reversely wound coils, it will be manifest that the number of coils may be varied to suit different conditions. For instance, four coils 31 may be used for split single-phase operation.

The valve shown in Fig. 1 is of the two-way type. Fig. 3 shows my invention applied to a three-way valve. The latter valve comprises a casing 60, having an inlet port 61 and two outlet ports 62 and 63 respectively. A closure member provided with two valve heads 64 and 65 respectively controls communication between port 61 and the ports 62 and 63. This closure member has pin-and-slot connection with an arm 66 pivoted at 67 within the casing. The free end of the arm has pin-and-slot connection with the shouldered stem corresponding in every respect to the stem 18. The stem is hammered in one direction or the other by a straight line motor exactly like that shown in Fig. 1 except that only four stator coils 31 are indicated diagrammatically, instead of six. These coils may be operated in a split-phase circuit such as shown in Fig. 4, or, in a three-phase circuit. A reversing switch for a three-phase circuit is well known in the art and needs no explanation here; for example, such a reversing switch for a set of stator coils in a three-phase circuit is shown in the parent application, Serial No. 275,682, of which the present application is a continuation in part. The casing tube 20 is sealed into the casing so that no leakage can occur.

In operation, on one throw of the reversing switch the armature will hammer the valve head 64 to closed position cutting off port 62 and opening port 63, while upon the next actuation of the reversing switch the valve head 65 will be hammered shut cutting off port 63 and opening port 63.

While I have described a preferred embodiment of my invention and a modification thereof, these are to be taken as illustrative and not limitative of my invention and I reserve the right to make various changes in form, construction and arrangement of parts without departing from the spirit and scope of the claims.

I claim:

1. A device of the character described comprising a casing, a member reciprocable therein, a stem on said member, an armature mounted to slide on the stem, stops limiting motion of the armature relative to the stem, means adapted to maintain the armature normally in a position intermediate between the stops, stator coils surrounding the armature, means for establishing a traveling field in the stator coils to move the armature, and a reversing switch operable independently of the movement of the armature for controlling the direction of travel of said field.

2. A device of the character described comprising a casing, a member reciprocable therein and having an operating stem, a reversible straight-line motor comprising an armature and stator coils, the armature being adapted to slide on the stem, stops limiting motion of the armature relatively to the stem, resilient means adapted to maintain the armature normally in a position intermediate the stops, a switch for reversing the motor, and means for effecting intermittent energization of the stator coils after each actuation of said switch.

3. A device of the character described comprising a casing, a member reciprocable therein and having an operating stem, a reversible straight-line motor comprising an armature and stator coils, the armature being adapted to slide on the stem, stops limiting motion of the armature relatively to the stem, resilient means adapted to maintain the armature normally in a position intermediate the stops, a switch for reversing the motor, and means for effecting intermittent energization of the stator coils after each actuation of said switch, the last mentioned means being adapted to maintain the coils in deenergized state after a predetermined number of energizations thereof.

4. A device of the character described comprising a casing, a member reciprocable therein, a straight line electric motor adapted to reciprocate said member, a reversing switch for reversing the motor, said motor comprising stator coils exterior to the casing and an armature sealed within the casing, and means constructed and arranged to effect intermittent actuation of the motor after each operation of the reversing switch so as to produce a series of hammer-like blows on said member in each direction of movement of the motor, said last-named means including instrumentalities for controlling the rate of the blows in each series.

LOUIS H. ROLLER.